United States Patent
Schluter et al.

(10) Patent No.: US 8,542,506 B2
(45) Date of Patent: Sep. 24, 2013

(54) METHOD AND APPARATUS FOR CONTROLLING THE POWER OF A TRANSFORMER USING A SOFT START CIRCUIT

(75) Inventors: Robert Schluter, Warwick, NY (US); Bernard P. O'Kane, Sussex, NJ (US); Brendan K. Walsh, Belvidere, NJ (US); Steve Kaufer, Wayne, NJ (US)

(73) Assignee: Middle Atlantic Products, Inc., Fairfield, NJ (US)

( * ) Notice: Subject to any disclaimer, the term of this patent is extended or adjusted under 35 U.S.C. 154(b) by 894 days.

(21) Appl. No.: 12/590,911

(22) Filed: Nov. 16, 2009
(Under 37 CFR 1.47)

(65) Prior Publication Data

US 2011/0115449 A1 May 19, 2011

(51) Int. Cl.
*H02H 7/00* (2006.01)
*H02H 7/122* (2006.01)

(52) U.S. Cl.
USPC ............. 363/50; 363/49; 363/55; 363/56.01; 363/56.09; 363/56.11; 363/56.12; 363/95; 363/97; 363/131; 363/135; 323/901; 323/908

(58) Field of Classification Search
USPC ............. 363/49, 50, 55, 56.01, 56.09, 56.11, 363/56.12, 95, 97, 131, 135; 323/901, 908
See application file for complete search history.

(56) References Cited

U.S. PATENT DOCUMENTS

| | | | |
|---|---|---|---|
| 5,345,359 A | | 9/1994 | Konstanzer |
| 5,365,162 A | | 11/1994 | Sundhar |
| 5,369,563 A | * | 11/1994 | Miller .................. 363/56.03 |
| 5,371,666 A | * | 12/1994 | Miller .................... 363/98 |
| 5,450,001 A | | 9/1995 | Konstanzer |
| 5,461,263 A | * | 10/1995 | Helfrich .................. 307/64 |
| 5,465,011 A | * | 11/1995 | Miller et al. ............. 307/64 |
| 5,479,086 A | | 12/1995 | Konstanzer |
| 5,517,380 A | | 5/1996 | Konstanzer |
| 5,642,025 A | | 6/1997 | Konstanzer et al. |
| 5,834,924 A | | 11/1998 | Konopka et al. |
| 6,055,167 A | | 4/2000 | Shamkovich et al. |
| 6,653,899 B2 | * | 11/2003 | Organvidez et al. ....... 330/207 P |
| 6,856,103 B1 | * | 2/2005 | Hudson et al. ............. 315/308 |

(Continued)

FOREIGN PATENT DOCUMENTS

EP 0575715 12/1993

OTHER PUBLICATIONS

Remanent Flux Measurement and Optimal Energization Instant Dertermination of Power Transformer; Goran Petrovic, Tomislav Kilic, & Stanko Milun; XVII Imeko World Congress; Jun. 22-27, 2003, 4 pages.

(Continued)

*Primary Examiner* — Bao Q Vu
(74) *Attorney, Agent, or Firm* — Drinker Biddle & Reath LLP

(57) ABSTRACT

A power isolation system and method is disclosed. The system includes a transformer suitable for use in the power isolation system, and a semiconductor device electrically connected to the transformer to provide a reduction of the inrush current associated with powering the transformer, wherein the semiconductor device is activated upon power up based upon the previous shutdown state of the power isolation system to provide a soft start to the transformer, and after activation of the transformer, the semiconductor device is shorted in the system.

25 Claims, 6 Drawing Sheets

(56) References Cited

U.S. PATENT DOCUMENTS

| | | | |
|---|---|---|---|
| 6,952,355 | B2 | 10/2005 | Riggio et al. |
| 7,049,858 | B2 | 5/2006 | Wong et al. |
| 7,093,048 | B2 | 8/2006 | Bobbitt et al. |
| 7,123,492 | B1 | 10/2006 | Ma |
| 7,141,895 | B2 | 11/2006 | Dumont et al. |
| 2002/0186573 | A1 | 12/2002 | Quintanar et al. |
| 2008/0136341 | A1* | 6/2008 | Araki et al. ............... 315/209 R |
| 2008/0266733 | A1 | 10/2008 | O'Leary et al. |
| 2009/0058378 | A1 | 3/2009 | Chee |

OTHER PUBLICATIONS

Elimination of Transformer Inrush Currents by Controlled Switching; Part I—Theoretical Considerations, John H. Brunke & Klaus J. Frohlich, pp. 1-6.

Elimination of Transformer Inrush Currents by Controlled Switching; Part II—Application and Performance Considerations, John H. Brunke & Klaus J. Frohlich, pp. 1-6.

Avoiding of transformer inrush-current peaks with a TSR, Michael Konstanzer, Aug. 6, 2004, pp. 1-47.

Reducing Startup-Time Inrush Current in Charge-Pump Circuits, Takao Myono, Yoshitaka Onaya, Kenji Kashiwase, Haruo Kobayashi, Tomoaki Nishi, Kazuyuki Kobayashi, Tatsuya Suzuki and Kazuo Henmi, IEICE Trans.Fundamentals, vol. E87-A, No. 4, Apr. 2004.

A Novel Method for Energizing Transformers for Reducing Inrush Currents; M.B.B. Sharifian, Farhad Shahnia, Ali Shasvand, Iraj hasanzadeh; Faculty of Electrical and Computer Engineering, University of Tabriz, Eastern Azarbayjan Electric Power Distribution Co., 5 pages.

Circuit Protection Solutions Guide; www.ttiinc.com; copyright ©2005 TTI, Inc., 21 pages.

Reducing the magnetizing inrush current by means of controlled energization and de-energization of large power transformers; László Prikler, György Bánfai, Gáror Bán, Péter Becker; Budapest University of Technology and Economics, Department of Electric Power Engineering, Power Systems and Environment Group, Feb. 7, 2006, pp. 642-649.

Transformer Inrush Current Reduction by Power Frequency Low Voltage Signal Injection to the Tertiary Winding; Balachandran D P, Sreerama Kumar R, Shimnamol V P, 2007 IEEE; pp. 6.

Fairchild Semiconductor IntelliMAXT Load Management Devices: Simplifying Designs and Reducing Power Consumption for Emerging Low-Voltage Electronics and Portable Appliances; Apr. 8, 2009, pp. 1-5.

Controlled Switching of Transformers—Effects of Closing Time Scatter and Residual Flux Uncertainty; Andreas Ebner, Michael Bosch and Renato Cortesi; 5 pages.

International Search Report, dated Jul. 8, 2011.

Konstanzer, M., "An Improperly Pair??—A toroidal transformer and a fast acting line protector switch with nominal current of the transformer", EMEKO Ing. Büro, http://www.emeko.de/uploads/media/08-einunmoegl-paar-k-e.pdf, Apr. 4, 2007.

International Preliminary Report on Patentability, dated May 31, 2012; 7 pages.

\* cited by examiner

METHOD AND APPARATUS FOR CONTROLLING THE POWER OF A TRANSFORMER USING A SOFT START CIRCUIT

FIELD OF THE INVENTION

The invention relates to an electronic transformer and soft start circuit, and, more particularly, to an electronic transformer and soft start circuit used to achieve increased filtration and voltage control, while providing the ability to use in a home or commercial environment.

BACKGROUND OF THE INVENTION

Transformers are often used to convert between high and low voltages, to change impedance, and to provide electrical isolation between circuits. Transformers are used in a wide variety of devices and processes, such as to provide electric power transmission over long distances, high-voltage direct-current HVDC power transmission systems, and for electric arc furnaces used in steelmaking. Rotating transformers are designed so that one winding turns while the other remains stationary to pass power or radio signals from a stationary mounting to a rotating mechanism, or radar antenna, to pass power or signals from a stationary mounting to a moving part such as a machine tool head. They can also be used for isolating and linking different parts of radio receivers and audio amplifiers, converting high current low voltage circuits to low current high voltage, or vice versa, and balanced-to-unbalanced conversion such as in radio and audio circuits to convert between balanced circuits and unbalanced transmission lines such as antenna downleads. While providing a myriad of electrical benefits and having many uses, transformers belong to a class of expensive components in an electric power system.

One of the problems that plague transformers is that they are subject to inrush currents when they are switched on. Inrush currents are instantaneous currents flowing in the transformer primary circuit when it is energized. These inrush currents are of short duration, unbalanced, high magnitude, high harmonic content and a dc component. An important facet of energizing power systems is the control of the inrush current that is generated and distributed within the system.

Multiple solutions to the problem of inrush current have been used over the years. These include having multiple drive circuits—one for large current and one for small current; incorporating an inrush current limiting resistor and a bypass capacitor in parallel with each other collectively placed in series with the bulk capacitance; adding a pair of transistors and a control circuit for activating at least one of the transistors for a period of time to reduce inrush current; controlling the inrush current by phasing up the input voltage in a controlled manner; and non-simultaneous three phase switching designed to reduce inrush currents. The conventional methods suffer from high resistance values and a great amount of loss associated with that high resistance, as well as uncertainty in residual flux and closing time scatter. Also, these methods become somewhat impractical in a home or office environment and, also, with audio and visual equipment.

Other disadvantages associated with inrush current include faulty operation and failures of electrical systems, electrical and mechanical vibrations among windings in the transformer, irregular voltage distribution along the transformer windings, high amount of voltage drop at the power system at energization times, resonances in the power system resulting from the varied frequencies of the inrush current, current disturbances, increase in harmonics in the system and lower power quality characteristics, and unwanted tripping of protective relays and fuses.

In dealing with these types of current issues, designers typically make tradeoffs between the capacitor or transformer values to minimize noise and/or EMI present in power supplies generated by switching and/or digital circuits and the management of turn-on and inrush currents.

Further, many attempts have been made to control or limit the inrush while not addressing, but only referring to, the underlying cause of the inrush—primarily the effects of the residual flux and closing time scatter.

Thus, a need exists for a circuit that can be used to allow transformers that operate equipment to be able to be started while reducing inrush current to a level compatible with a home or office environment by addressing the effects of the residual flux and closing time scatter.

SUMMARY OF THE INVENTION

A power isolation system is disclosed. The system includes a transformer suitable for use in the power isolation system, and a semiconductor device electrically connected to the transformer to provide a reduction of the inrush current associated with powering the transformer, wherein the semiconductor device is activated upon power up of the power isolation system to provide a soft start to the transformer, and after activation of the transformer, the semiconductor device is shorted in the system.

A method of soft starting a transformer is also disclosed. The method includes monitoring the phase angle of the incoming AC signal, configuring a semiconductor device in a zero conduction configuration, opening a relay to place the semiconductor device in the circuit containing the transformer, ramping the conduction of the semiconductor device from zero to full conduction, and after full conduction is achieved on the semiconductor device, shorting the semiconductor device from the circuit containing the transformer.

The present invention can be used, for example, as part of an audio component circuit including stages of amplifiers. The circuit includes a transformer suitable for use as a coupling for stages of amplifiers and a triac electrically connected to the transformer to provide a reduction of the inrush current associated with powering the transformer. The triac is activated upon power up of the audio component circuit to provide a soft start to the transformer, and after activation of the transformer the triac is shunted.

A method of stopping conduction to minimize the residual flux of a transformer is also disclosed. The method includes opening a relay to place a semiconductor device in the circuit containing the transformer, and ramping the conduction of the semiconductor device from full to substantially zero conduction, and after substantially zero conduction is reached on the semiconductor device, the residual flux of the transfer is minimized. The method further includes configuring the semiconductor device in a full conduction configuration. The ramping to substantially zero conduction includes falling below the holding current of the semiconductor device.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

Figure 1:
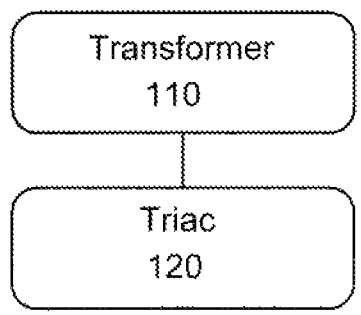
FIG. 1 is a circuit box diagram according to an aspect of the present invention.

It is to be understood that the figures and descriptions of the present invention have been simplified to illustrate elements that are relevant for a clear understanding of the present invention, while eliminating, for the purpose of clarity, many other elements found in traditional circuits and power networks. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The present invention is designed to take advantage of the preferential filtration characteristics of a toroidal transformer while decreasing the exhaustive current required by such transformers upon power up. The decrease in the amount of current required upon power up may occur using a myriad of different techniques, such as by including a triac with the transformer of the present invention. Also, a quadrac may be placed in series with a toroidal transformer to utilize the filtration of the toroidal transformer during normal operation, yet decrease the inrush current required by the transformer at start-up. While the present description focuses on the use of a toroidal transformer, the present invention may be used with a conventional transformer to limit the inrush current required during energizing.

Many electrical issues can arise when designing a system, including ground loops and common-mode/differential-mode high frequency noise. These problems can arise from poor or improper wiring techniques, and from equipment designed with lesser quality common-mode rejection ratio (CMRR). Equipment problems cannot always be resolved, but the present invention may help to prevent the negative effects of these problems. The present invention may protect connected equipment from voltage spikes and unsafe conditions, such as over- and under-voltage or when ground integrity is compromised, by performing an automatic shutdown, for example. The present invention may also provide low loss and very high efficiency design to minimize magnetic leakage, allowing it to be rack mountable, if desired, acoustical noise, and idle power draw. The present invention is capable of providing under-load efficiency of 98% or more (compared to 95% efficiency with conventional configurations), and an idle power draw of typically only 9 W (as compared to 100 W draw on some conventional configurations). Thus, the present invention provides increased efficiency and less power usage, thus, providing a more economical power system.

The present invention may provide effective AV system isolation from electrical noise such as lighting dimmers, for example. The present invention may allow a higher voltage feeder and integrated load center design to be utilized. The present invention may employ a newly derived reference ground to help prevent ground loops, provide the lowest possible noise floor and may provide same-phase output circuits while having inaudible acoustical noise. The present invention may eliminate voltage induction on ground wire feeder.

Referring now to FIG. 1, there is shown a circuit box diagram according to an aspect of the present invention. As may be seen in FIG. 1, the circuit box diagram of the present invention includes a transformer 110 and triac 120 electrically interconnected.

Transformer 110 is a device that transfers electrical energy from one circuit to another through inductively coupled conductors. The conductors may be wound around a single iron-rich core, or around separate but magnetically-coupled cores, as would be evident to those possessing ordinary skill in the pertinent arts. Operationally, a varying current in the first or "primary" winding creates a varying magnetic field in the core (or cores) of the transformer. This varying magnetic field induces a varying electromotive force (EMF) or "voltage" in the "secondary" winding. This effect is called mutual induction.

When a load is connected to the secondary winding, an electric current will flow in the secondary winding and electrical energy will flow from the primary circuit through the transformer to the load. In an ideal transformer, the induced voltage in the secondary winding is in proportion to the primary voltage, and is given by the ratio of the number of turns in the secondary to the number of turns in the primary. Operation of a transformer is based on two principles: firstly, that an electric current can produce a magnetic field (electromagnetism) and secondly that a changing magnetic field within a coil of wire induces a voltage across the ends of the coil (electromagnetic induction). Changing the current in the primary winding changes the magnitude of the applied magnetic field. The changing magnetic flux extends to the secondary winding where a voltage is induced across its ends. Generally, the primary and secondary coils are wrapped around a core of material having very high magnetic permeability, such as iron by way of non-limiting example. This ensures that most of the magnetic field produced by the primary current is within the iron and passes through the secondary coil from the primary coil.

Transformer 110 may take the form of any transformer or a group of similarly matched transformers. In particular, conventional transformers tend to be electrically noisy, leak substantial magnetic field, are generally lossy, run hot and often generate an audible hum. Additionally, conventional transformers require an inrush current to energize. These transformer properties may be troublesome when used in audio and visual equipment in a home or office environment, although the present invention may be applied to such uses. Toroidal transformers provide better filtration than do conventional transformers, but toroidal transformers require hundreds of times the operating current to energize. For example, when a toroidal transformer is over 2.5 kVA, the inrush current at 240 V may be over 1000 A; and for 5 kVA, the inrush may be up to 1800 A. This current level is not available in home and office settings, and therefore such current requirement provides an impediment for use in audio and visual equipment for a home or office.

Toroidal transformers generally are more efficient than conventional transformers for a similar power level. Other advantages compared to conventional transformers, include smaller size, lower weight, less mechanical hum (making them superior in audio amplifiers), lower exterior magnetic field, low off-load losses (making them more efficient in standby circuits), and single-bolt mounting.

A triac, which is the generic designation for a TRIode for Alternating Current, is an electronic component approximately equivalent to two silicon-controlled rectifiers (SCRs/thyristors) joined in inverse parallel and having the gates of each connected together. Such a connection may be referred to more specifically as a paralleled connection but with the polarity reversed. The present invention incorporates a triac 120 which may have a first connection MT1, a second connection point MT2, and the common ground G.

The use of triac 120 may result in a bidirectional electronic switch which may conduct current in either direction when it is triggered and, therefore, has no polarity. Triac 120 may be triggered by either a positive or a negative voltage being applied to its gate electrode with respect to MT1. Once triggered, triac 120 may continue to conduct until the current through it drops below a certain threshold value, which may be defined as the holding current. When triac 120 shuts off by dropping below the threshold, the triac commutates. Triac 120 may be used as a switch for the AC circuit of the present invention, allowing the control of very large power flows with milliampere-scale control currents. In addition, applying a trigger pulse at a controllable point in an AC cycle allows one to control the percentage of current that flows through the triac to the load.

Triac 120 may additionally include a snubber circuit used between connections MT1 and MT2 to assist in the turn-off. Such a turnoff may provide the ability to reduce the effects of the triac in the circuit during normal operation. This may create a scenario where triac 120 functions as a quadrac, by way of non-limiting example only. This snubber circuit may be formed as a RC type, for example.

The snubber circuit of the present invention may include a diac trigger mounted inside the same package. Assembling within the same package may provide the benefit of eliminating expense and assembly time of buying a discrete diac and assembling in conjunction with a gated triac. In operation the triac with associated snubber circuit forming a quadrac device remains a bidirectional AC switch that is gate controlled for either polarity of main terminal voltage.

When triac 120 and a snubber circuit is used in series with a transformer it operates to produce a weak magnetic field in the core of the transformer and then it is shunted to allow full line voltage and current to be consumed in the transformer.

ALTERNISTOR is a trade name for a Teccor brand triac having an improved turn-off characteristic. These devices are made specifically for improved turn-off when controlling a highly-inductive load, such as a motor, an application which causes problems for "normal" triacs due to high voltage/current angles. Most triacs' turn-off functionality with inductive loads may be improved by use of a "snubber network" as described hereinabove, but ALTERNISTOR triacs may achieve this purpose and reduce or eliminate the need for the snubber requirement.

According to an aspect of the present invention, triac 120 may also include a gate resistor or capacitor, or both, configured electrically in parallel with each other and may be connected between the gate and MT1, which may be used to, among other things, prevent false triggering.

The use of the triac 120 in series, on start-up, reduces the thirst for current such that a 5 kVA transformer may only require 20 A peaks at 240 V. This current requirement quickly decreases to 500 mA in a few cycles. Once power-up is achieved and the magnetic field of the toroidal transformer is created, at least weakly (a time of about 1-5 sec), triac 120 may be shunted to thereby allow full line voltage and current to be consumed in the toroidal transformer. At this point the positive benefits, including increased filtration and quieter operation of the toroidal transformer may be realized.

Figure 2:
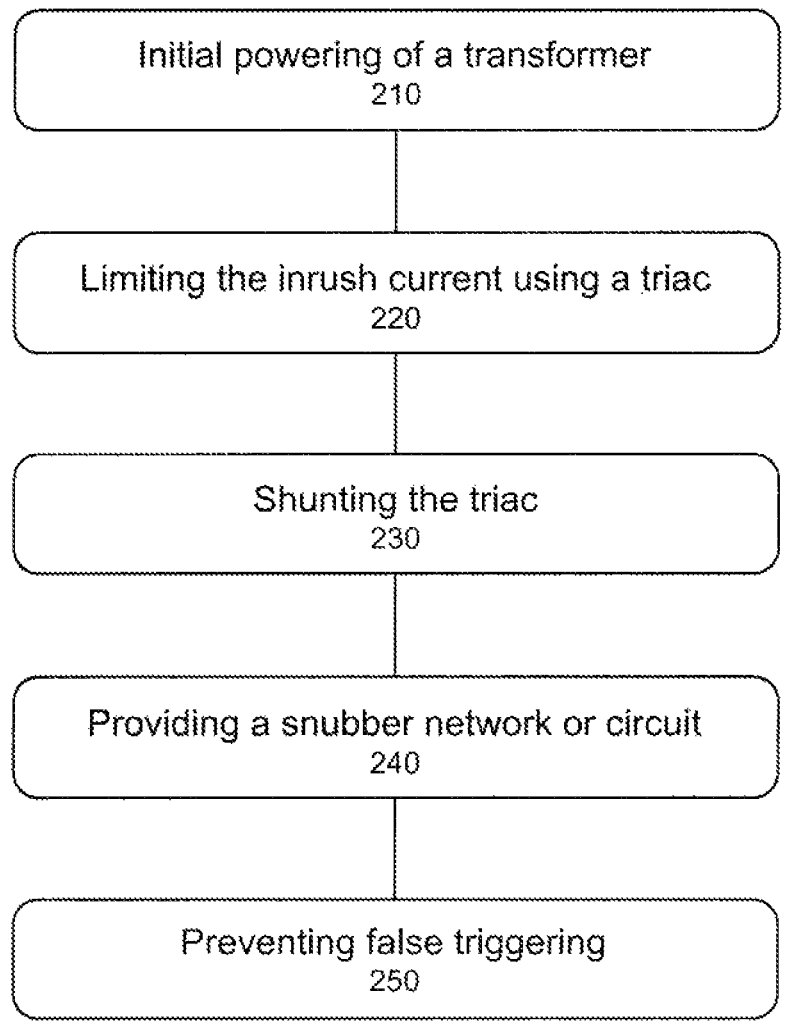
FIG. 2 is a method of starting a transformer according to an aspect of the present invention.

Referring now to FIG. 2, there is shown a method of power isolation according to an embodiment of the invention. This method includes the initial powering of a transformer 210. The method also includes limiting the inrush current using a triac 220 by producing a weak magnetic field in the core of the transformer. The method includes shunting the triac 230 to allow full line voltage and current to be consumed in the transformer. The method may also include providing a snubber network or circuit 240 associated with the triac in order to improve commutation of the triac during start-up operation.

Figure 3:
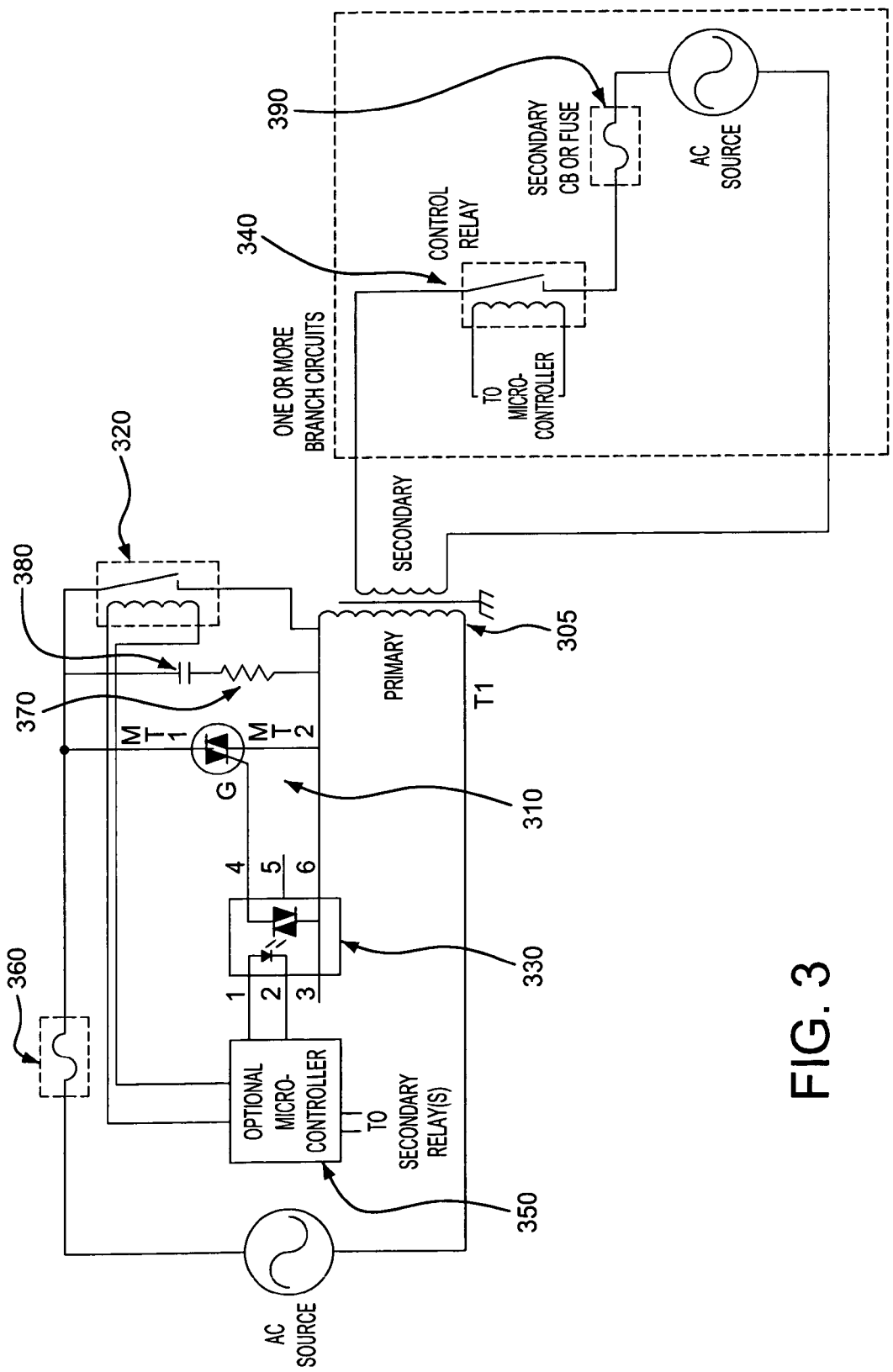
FIG. 3 is a circuit diagram of an aspect of the present invention.

Referring now to FIG. 3, there is shown a circuit diagram of one aspect of the present invention. As shown in FIG. 3, this embodiment of the present invention includes a transformer 305, and on the primary side of transformer 305, a semiconductor device 310, a shorting relay 320, a quadrac 330 electrically interconnected, and a control relay 340 on the secondary side of transformer 305. As discussed above, while a quadrac is used in one embodiment, the present invention can be tailored to use other components for providing the control. Additionally, on the primary side of the circuit the present invention preferably includes a microcontroller 350, an AC source, a main circuit breaker or fuse 360, a resistor 370 and capacitor 380. On the secondary side of the circuit, the present invention may also include a secondary circuit breaker or fuse 390.

As may been seen in FIG. 3, the primary windings of transformer 305 are in series with shorting relay 320, which is in parallel with the serially configured resistor 370 and capacitor 380 and in parallel with first connection MT1 and second connection MT2 of semiconductor device 310. The gate G of semiconductor device 310 may be electrically coupled to quadrac 330, which is preferably controlled by microcontroller 350. Also shown in FIG. 3, the secondary side of the circuit includes the secondary windings of transformer 305, control relay 340, an AC source, and secondary circuit breaker or fuse 390, which are configured in series.

The AC source on the primary side of the transformer may take the form of a 240 volt or 120 volt alternating current source, for example. This may be the type of source delivered by connection to a building electrical line, for example.

Transformer 305 may take the form of a transformer as described hereinabove with respect to transformer 110. Specifically, transformer 305 may be a device that transfers electrical energy from one circuit to another through inductively coupled conductors. The conductors may be wound around a single iron-rich core, or around separate but magnetically-coupled cores, as would be evident to those possessing ordinary skill in the pertinent arts. Operationally, a varying current in the first or "primary" winding creates a varying magnetic field in the core (or cores) of the transformer. This varying magnetic field induces a varying electromotive force (EMF) or "voltage" in the "secondary" winding. This effect is called mutual induction. Transformer 305 may be a toroidal isolation transformer and, when used with the present invention may, under load, achieve a greater than 98% high efficiency with an alloy core, and include a single 120V secondary winding with a Faraday shield, to thereby enable all circuits to be on the same phase. Such a transformer when incorporated into the present invention has been shown to use approximately ¼ the power consumption of typical transformer systems.

Semiconductor device 310 may take the form of triac 120 as described above, by way of non-limiting example only. Semiconductor device 310 may also take the form of other switches known to those possessing an ordinary skill in the pertinent arts. Specifically, semiconductor device 310 may be a bidirectional electronic switch which may conduct current in either direction when it is triggered and, therefore, has no polarity. Semiconductor device 310 may be triggered by either a positive or a negative voltage being applied to its gate electrode with respect to MT1 and once triggered, may continue to conduct until the current between MT1 and MT2 drops below a certain threshold value, which may be defined as the holding current. Semiconductor device 310 may be used as a switch for the AC circuit of the present invention, allowing the control of very large power flows with milliampere-scale control currents. Semiconductor device 310 may, upon power up of the circuit of the present invention, be utilized to control the current flow in the circuit. This may be accomplished by initiating semiconductor device 310 and then stepping it back until full conduction occurs at which point semiconductor device 310 may be shorted from the circuit using shorting relay 320, described hereinbelow. Microcontroller 350 may effectuate the process of stepping semiconductor device 310 and shorting relay 320 as described below. Use of semiconductor device 310 provides tighter control of switch in time. According to an aspect of the present invention, the uncertainty of operation is on the order of a few microseconds, and may only be limited by the speed of microcontroller 350. In comparison, using a high speed mechanical device may result in a closing time scatter in the range of 0.5-1.5 milliseconds. Increasing the speed of microcontroller 350 may further reduce the scatter and thereby may improve accuracy.

By controlling the turnoff time, the present invention provides a more accurate prediction of the level of residual flux in the transformer. In an ideal configuration, the residual flux will be zero since the present invention shuts down the voltage as soon as the current is zero.

In circumstances where the turn off becomes uncontrolled such as over current situations, for example, the present invention may suffer from greater measurement uncertainty. As this situation is only a small minority of the turn offs, the present invention utilizes resistor 370 in series with semiconductor device 310. Resistor 370 may be a traditional resistor base inrush limiter. During normal operation, resistor 370 may account for only 3-4% of the total circuit impedance for the circuit of the present invention. The remaining 96-97% of the total circuit impedance results from the impedance of transformer 305.

Shorting relay 320, broadly defined, is an electrical switch that opens and closes under the control of another electrical circuit. Shorting relay 320 may take the form of a latching relay or solid state relay, by way of non-limiting examples only. Shorting relay 320 may be controlled by microcontroller 350 as described hereinbelow. As shown in FIG. 3, shorting relay 320 may be configured to short the path from the AC source to transformer 305 during operation and to alternatively be opened to power semiconductor device 310 as needed and determined by microcontroller 350.

Control relay 340 may take the form essentially of an electromagnet with two possible states arranged so that when there is sufficient current, the core of the relay's coil attracts a ferromagnetic armature which mechanically operates switches; a spring holds the armature away from the core when not actuated. The spring is designed to snap the contacts between two stable mechanical states. A relay allows circuits to be switched by electrical equipment: for example, a timer circuit with a relay could switch power at a preset time. Control relay 340 may be controlled by microcontroller 350 as described hereinbelow. As shown in FIG. 3, control relay 340 may be configured to short the path from the secondary windings of transformer 305 to the AC source during operation and to alternatively be opened while powering transformer 305 as needed and determined by microcontroller 350.

Microcontroller 350 may take the form of a small computer on a single integrated circuit consisting of a relatively simple CPU combined with support functions such as a crystal oscillator, timers, watchdog, serial and analog I/O, and the like. Program memory in the form of NOR flash or OTP ROM is also often included on chip, as well as a, typically small, read/write memory. Microcontroller 350 may operate at clock frequencies as low as 32 kHz, which may enable low power consumption. Microcontrollers are well known in the art and, therefore, no further description is necessary. Microcontroller 350 preferably has the ability to retain functionality while waiting for an event, such as the phase angle determination or fire determination described hereinbelow. Microcontroller 350 may monitor the circuit of the present invention to track the phase angle of the AC signal provided by the AC source. Based on this information, microcontroller 350 may make a fire determination, such as at a phase angle of 90 degrees. This fire determination may further decrease the current flow in the system during power-up.

Upon powering up, the system of the present invention may, such as by direction of microcontroller 350, for example, open shorting relay 320 to place semiconductor device 310 into the circuit. Control relay 340 may also be positioned in an open configuration. Semiconductor device 310 may be configured in a zero conduction state. As power begins to flow, semiconductor device 310 is preferably configured to ramp its conduction starting at or near the last point of shutdown to full conduction. This may be performed under the direction of microcontroller 350, for example.

In operation, in the case where semiconductor device 310 is a triac, for example, a current flow between the gate of the triac and MT1 may allow a larger current flow between MT2 and MT1. So by controlling, such as via microcontroller 350, the current flow between G and MT1 (gate pulse), the amount of current flow between MT2 and MT1 may be controlled. Once current flow between MT2 and MT1 is initiated it may continue without any dependency on the current flow between G and MT1—i.e., controlling the gate cannot turn off the current flow. When the current flow between MT2 and MT1 stops, at some time after the voltage zero cross depending on the level of inductance in the circuit, the triac may commutate and thereby block any current flow until another gate pulse occurs. It is possible that the amount of inductance in the circuit of the present invention and transformer 305 may cause the current and voltage to be out of phase by up to 90 degrees, for example. Control in the present system may be achieved by blocking current flow after the current zero cross or the associated time shift from the voltage zero crossing as the inductance of the system dictates. Then at the proper time in the cycle, microcontroller 350 may gate the triac allowing current to flow. By blocking the current flow for a short time after zero cross, more current may be delivered to transformer 305. Delaying for a longer period after zero cross delivers less to transformer 305. Once the triac is commutated the gate pulse in the next half cycle may be used to again control the size of the current flow between MT2 and MT1. Once full conduction has been achieved in semiconductor device 310, shorting relay 320 may be activated to thereby short semiconductor device 310 from the circuit. Similarly, control relay 340 may also be activated to close and complete the secondary side of the circuit.

Microcontroller 350 may also take the form of a zero crossing detector or a phase angle detector while performing functionally the same process as described herein for a monitoring type microcontroller. Generally, for most commercial uses of the present invention, it is sufficient to only detect zero phase crossings for triggering. However, about 25 percent of the time there is magnetism in the transformer at the time of shutdown. As such, the microcontroller can be used to detect this occurrence (through use of conventional phase detection techniques) and store the information for purposes of more accurately controlling the triggering (firing) at start-up. The sampling frequency of microcontroller 350 may be chosen to be fast enough to allow micro controller 350 to be able to keep up with the zero crosses. By way of non-limiting example only, a sampling rate of 300 μs may be used. Every 300 μs a sample may be taken and compared with an expected level that is calculated based on the standard line voltage. Deviations from the expected waveform may be logged as a possible fault, for example. The control of the triac in the previous example may be limited by the number of bits in microcontroller timer, clock rate and the uncertainty in response time of the present invention. This uncertainty has been driven to the micro second level in the present invention.

Main circuit breaker or fuse 360 may take the form of a traditional circuit breaker that is an automatically-operated electrical switch designed to protect an electrical circuit from damage caused by overload or short circuit. The basic function of main circuit breaker 360 may be to detect a fault condition and, by interrupting continuity, to immediately discontinue electrical flow. Alternatively, fuse 360 may be used to detect a fault condition and interrupt continuity to discontinue electrical flow. The main difference between a circuit breaker and a fuse is that once a fuse operates to protect a circuit it needs to be replaced, while a circuit breaker can be reset to resume normal operation.

Resistor 370 and capacitor 380 may form a typical RC circuit as would be evident to those possessing an ordinary skill in the pertinent arts. This RC circuit configured from resistor 370 and capacitor 380 may be used to operate as a snubber circuit as described hereinabove and may be configured to provide a reduction of the effects of semiconductor device 310 during normal operation.

Secondary circuit breaker or fuse 390 may take the form of a traditional circuit breaker or fuse that is an automatically-operated electrical switch designed to protect an electrical circuit from damage caused by overload or short circuit. This breaker or fuse may be of similar design to that described with respect to main circuit breaker or fuse 360, for example.

Figure 4:
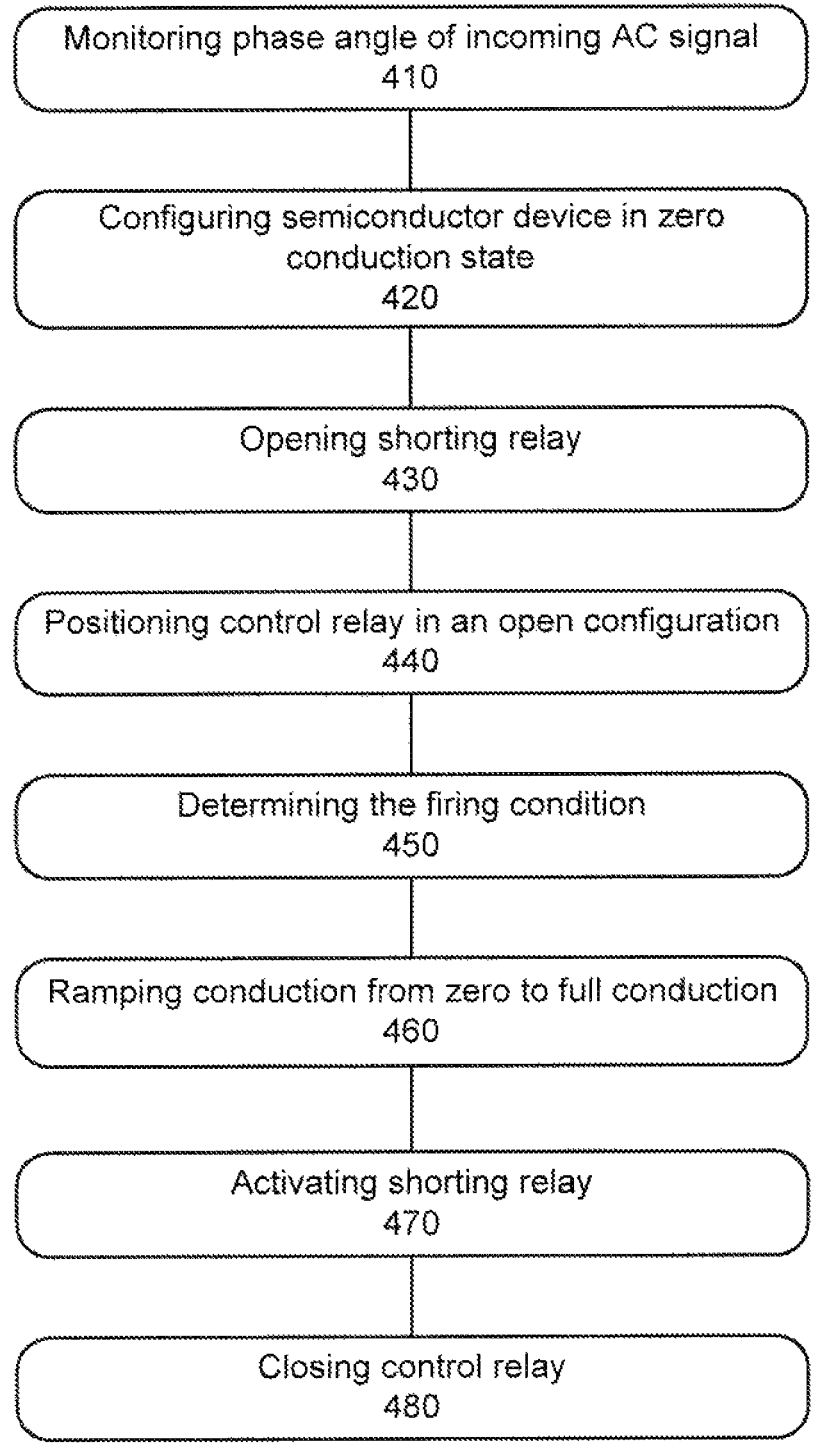
FIG. 4 is a flow diagram of the soft start feature using the circuit of FIG. 3 according to an aspect of the present invention.

Referring now also to FIG. 4, there is shown a flow diagram of the method of soft starting a transformer using the circuit of FIG. 3 according to an aspect of the present invention. This method operates by having microcontroller monitor 410 the circuit of the present invention to track the phase angle of the incoming AC signal. Semiconductor device may be configured 420 in a zero conduction state. Shorting relay may be opened 430 to place semiconductor device into the circuit at the appropriate time, such as at startup. Control relay may also be positioned in an open configuration 440, such as to protect downstream devices, for example. The method also involves the step of determining the fire condition (making a fire determination) 450, such as at a detected phase angle of the incoming power of 90 degrees, for example, to further decrease the current flow in the system during power-up. As power begins to flow, semiconductor device may ramp 460 conduction from zero to full conduction, thus limiting inrush. Once full conduction has been achieved in the semiconductor device, shorting relay may be activated to thereby short 470 semiconductor device from the circuit. Similarly, control relay may also be closed 480 to complete the secondary side of the circuit.

In a similar fashion to the soft start procedure described hereinabove, a soft shutdown procedure may also be employed according to an aspect of the present invention. Such a soft shutdown may enable the monitoring device, such as microcontroller 350, to constantly maintain knowledge of the phase angle of the AC signal provided by the AC source, and thus the magnetism of transformer, and control of the circuit to drain the transformer of magnetism at the time of shutdown. Such a soft shutdown may be employed when the on/off button on a device is activated. In such a soft shutdown, semiconductor device 310 may be placed into a full conduction mode and shorting relay 320 may then be opened to place semiconductor device 310 into the circuit. Similarly, control relay 340 may also be opened, as necessary. Once semiconductor device 310 is in the system, a ramp down from full conduction of semiconductor device 310 may occur to control the transfer and the associated current as transformer 305 is similarly ramped down. Since semiconductor device 310 is configured to be "open" when the current reaches zero amperes, or falls below the holding current, which may be a small value, the flux density of the core must be similarly at or near zero, thus eliminating, or at least minimizing, the effects at the next startup.

According to an aspect of the present invention, using the voltage, the state of influx in the cone may be inferred. The voltage is known to be:

$$V = V_{peak} \sin \grave{\omega} t,$$

where Vpeak is the maximum voltage and $\grave{\omega}$ is the angular velocity in radians per second.

The core flux ($\phi$) is known to be related to the voltage by the integral $$\phi = \frac{1}{N} \int v \, dt$$

$$\phi = \frac{1}{N} \int (V_{peak} \times \sin \omega) t \, dt$$

$$= \frac{1}{N} V_{peak} \times \cos \omega t + \beta r$$

where N is the number at turns in the primary coil and βr is the remnant flux of the core. βr is approximately the flux density at the time the magnetizing current was removed, and changes little over time.

The magnetizing current is also known to be the integral of the voltage $$i = \left(\frac{V_{peak}}{z}\right) \int \sin \omega t \, dt$$

$$i = \left(\frac{V_{peak}}{z}\right) \cos \omega t + i$$

where i is the DC offset of the current, and z is the impedance of the core for a given a ω.

In a transformer or inductor as the magnetizing current approaches zero, the flux approaches zero as well. Using this knowledge, the residual flux of the core may be controlled to eliminate or reduce inrush currents.

By removing the voltage from the transformer at an angle of 90° (1.5708 rad) or 270° (4.7124 rad), ϕ (90°)=1/N (Vpeak) cos (90°)=1/N (Vpeak) (0)=0

Figure 5:
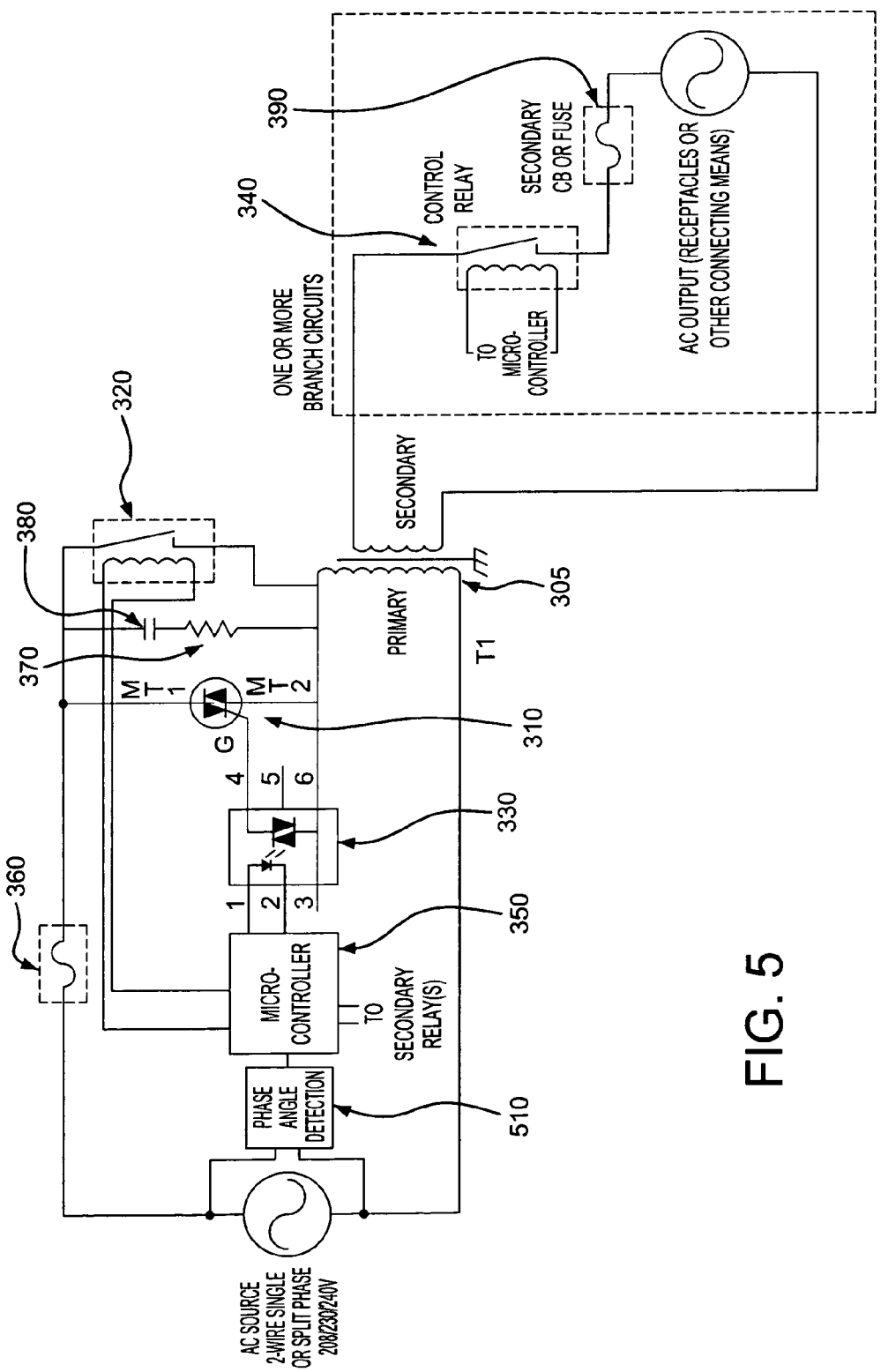
FIG. 5 is a circuit diagram of an aspect of the present invention shown in FIG. 3.

Referring now to FIG. 5, there is shown a circuit diagram including phase angle detection in the circuit shown and discussed with respect to FIG. 3. Phase angle detector 510 samples the signal from the AC source, which may be 2-wire single or split phase 208/230/240 V, for example. As is shown in FIG. 5, phase angle detector 510 may be placed in parallel with the AC source in order to sample the signal while having minimal effect on the signal itself. Phase angle detector 510 may also be connected to microcontroller 350 via a detector output. Phase angle detector 510 may be configured to detect the zero crossing of the AC signal from the AC source of the present invention. Phase angle detector 510 may provide microcontroller 350 information regarding the phase angle of the input signal from the AC source, including but not limited to the zero crossing. As described hereinabove, microcontroller 350 may use the zero crossing in controlling semiconductor device 310 in order to limit inrush according to an aspect of the present invention.

Figure 6A:
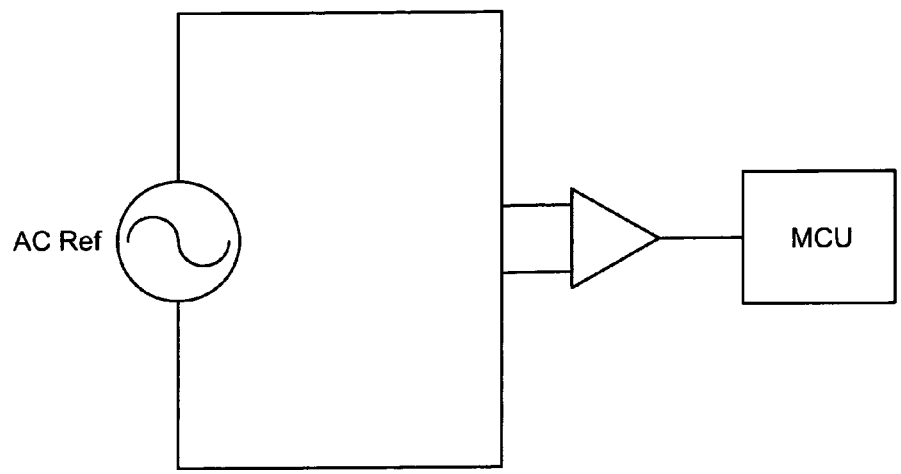
FIG. 6A is a configuration for monitoring the zero crossing according to an aspect of the present invention.
Figure 6B:
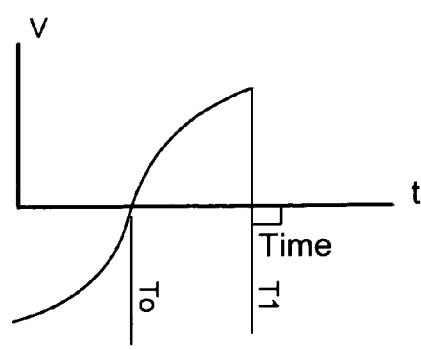
FIG. 6B is a AC reference curve found in the zero crossing monitor of FIG. 6A.
Figure 6C:
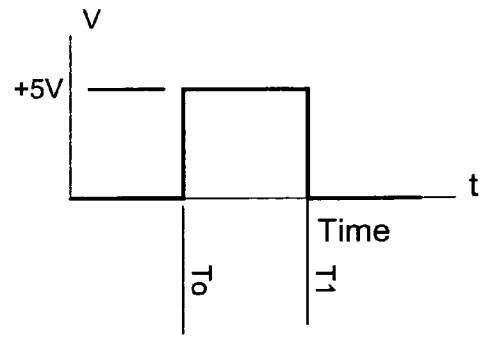
FIG. 6C is a microcontroller input curve found in the zero crossing monitor of FIG. 6A.

According to an aspect of the present invention, phase angle may be monitored in several ways. A simple "zero" crossing detector on secondary of the sense transformer may be used. Referring now also to FIG. 6A, there is shown a configuration for monitoring the zero crossing. With main transformer attached natural response is under damped so the voltage crosses zero (swinging positive or negative with respect to zero) before settling. This microcontroller monitors the AC reference with a curve as shown in FIG. 6B, and the input curve found on the MCU input shown in FIG. 6C. When voltage crosses zero an interrupt may be generated and the time at which the voltage crossed zero is recorded for the next startup.

The invention may also use an analog-digital converter to compare the voltage waveform to an expected waveform based on nominal line voltage:

$$V_{nom} \pm 10\% @ \phi_{nom} \pm 5\%;$$

Where Vnom is the nominal line voltage and ϕ nom is the nominal line frequency. This may be used for cases where the connected loads are such that the voltage response becomes over damped or critically damped.

Figure 7A:
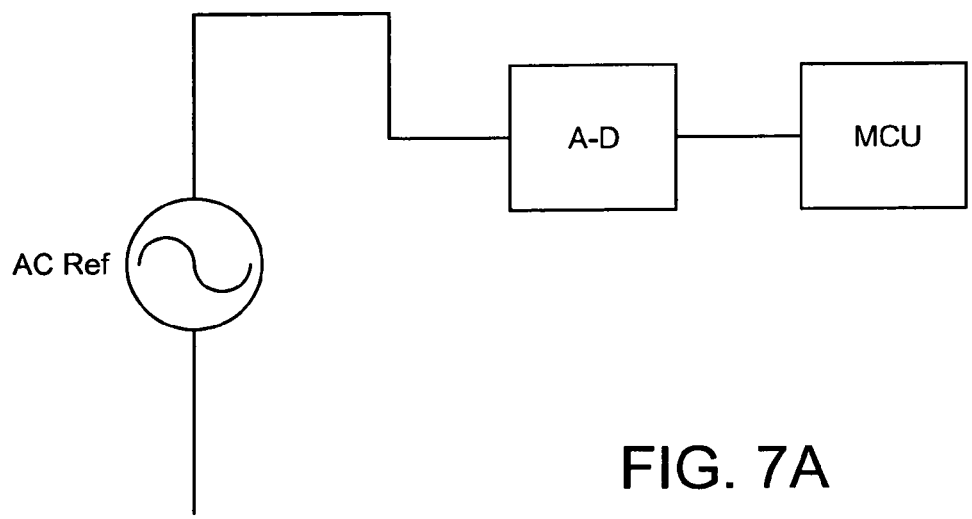
FIG. 7A is a configuration for monitoring waveform using the microcontroller and an analog-digital converter; and, FIG. 7B is a curve used in the waveform monitoring of FIG. 7A.
Figure 7B:
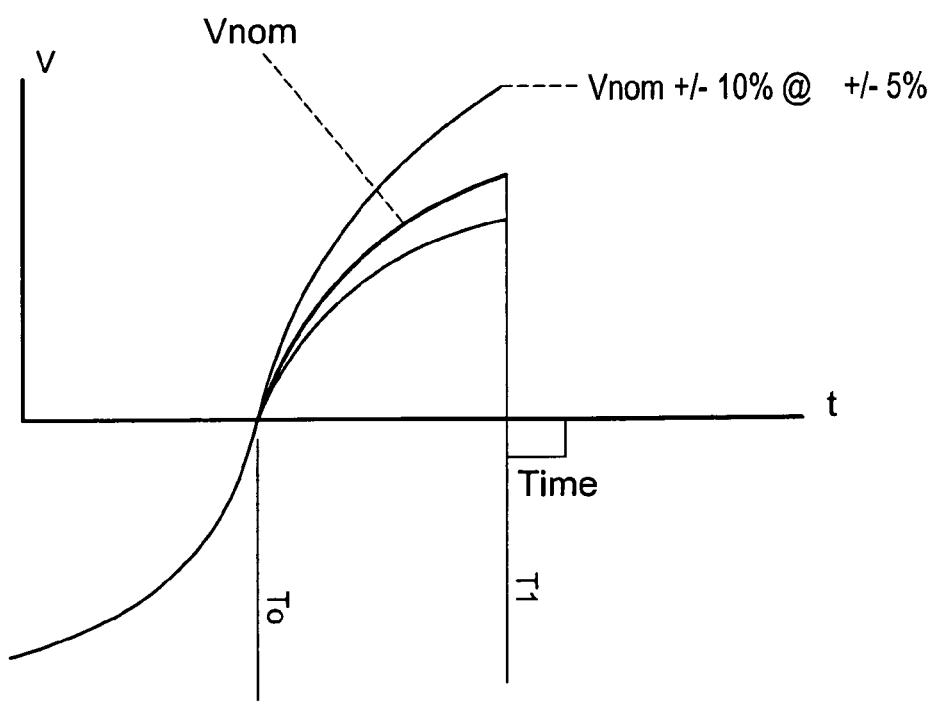

Referring now to FIG. 7A, there is shown a configuration of the present invention for using the analog-digital converter in comparing the waveform to an expected waveform in conjunction with the microcontroller. This comparison may be performed using the Vnom equation above. The curve for the Vnom equation used in the comparison of FIG. 7A is shown in FIG. 7B showing Vnom and Vnom±10% @ ϕ nom±5%. In performing the comparison, the waveform may be sampled at regular intervals during the cycle and deviations outside of the expected tolerance are logged as possible faults. In the event the simple "zero" crossing detector described hereinabove fails to detect a zero crossing within a specified window after the previous zero crossing (@ 60 Hz this is ~8.33 ms±5%), the time at which the waveform deviated is recorded as a fault or dropout in voltage and used for the next start-up time.

According to an aspect of the present invention, input voltages may be 240 and 208 and may have 5 KVA of power with a new separately derived neutral ground bond point. Alternatively, the present invention may be configured to operate with input voltages of 120 volts and less than 5 KVA or power, for example. The present invention may be controlled by a main circuit breaker located in the front of the unit which will disconnect all primary power to the transformer. The isolation transformer may have a Faraday shield to attenuate common-mode noise. The present invention may control circuits via four 20A breakers in a load center located in the front panel and contain two indicating LEDs for ground integrity and voltage monitoring status. The monitoring circuits may be equipped to shut down the receptacles if the ground or voltage is compromised. When the ground or voltage returns back to normal operation the auto function will restore the receptacles to a normal condition.

The ground integrity monitor may constantly monitor the primary ground conductor for the proper connection. A green LED may be utilized to indicate via illumination if a proper ground is sensed. A red LED may illuminate if the ground integrity is compromised. Power to the outlets may be disconnected if the ground is not present. The unit will automatically reset and power up the load receptacles if a proper ground connection is re-established.

The voltage range monitor circuit may be incorporated to monitor the 240/208 Volt input. A green LED may illuminate to indicate that proper voltage is being applied to the transformer. A red LED may illuminate if the voltage is out of range (High or Low). This monitoring LED function may operate when the main circuit breaker is the "on" position. If the "out of voltage range" is detected a signal may be sent to the output power relay to disconnect the output power. Power on may automatically be re-initiated when the voltage is "in range". A delay circuit may be incorporated to allow short, out of voltage range aberrations to be ignored.

An external ground bus may be included in the present invention, such as at the rear of the unit, in order to provide a termination point for establishing a low impedance single point grounding system (SPG) for the rack enclosure and connected equipment.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

We claim:

1. A power isolation system, said system comprising:
 a transformer suitable for use in the power isolation system;
 a semiconductor device electrically connected to said transformer to provide a reduction of the inrush current associated with powering said transformer,
 wherein said semiconductor device is activated upon power up of the power isolation system to provide a soft start to said transformer, and after activation of said transformer said semiconductor device is shorted in the system; and
 a microcontroller for controlling the firing of the transformer to reduce the inrush current upon power up,
 wherein said microcontroller monitors the phase angle of the incoming power signal and stores the phase angle at shutdown, and wherein the microcontroller makes a fire determination when the phase angle is approximately at the stored shutdown angle or if there is no stored shutdown angle at about 90 degrees.

2. The system of claim 1, wherein said semiconductor device is a triac.

3. The circuit of claim 2, wherein said triac comprises an alternistor.

4. The system of claim 1, wherein shorting of the semiconductor device occurs by using a shorting relay.

5. The system of claim 1, further comprising a protection for downstream devices.

6. The system of claim 5, wherein said protection comprises a control relay that is opened for said protecting.

7. The system of claim 1, wherein said microcontroller controls a shorting relay designed to short said semiconductor device from the circuit.

8. . The system of claim 1, wherein said microcontroller controls a control relay designed to protect downstream devices during power up.

9. The circuit of claim 1, wherein said transformer is a toroidal transformer.

10. The circuit of claim 1, wherein said semiconductor device comprises a false trigger prevention circuit.

11. The circuit of claim 10, wherein said false trigger prevention circuit includes at least one resistor.

12. The circuit of claim 10, wherein said false trigger prevention circuit includes at least one capacitor.

13. The circuit of claim 10, wherein said false trigger prevention circuit includes a RC circuit.

14. The circuit of claim 1, wherein said semiconductor device comprises a snubber circuit for assisting in the turn off of said semiconductor device once said transformer is substantially fully powered.

15. The circuit of claim 14, wherein said snubber circuit includes a RC circuit.

16. A method of soft starting a transformer, said method comprising:
    monitoring the phase angle of an incoming AC signal:
    configuring a semiconductor device in a zero conduction configuration;
    opening a relay to place the semiconductor device in the circuit containing the transformer;
    increasing the conduction of the semiconductor device from zero to full conduction;
    after full conduction is achieved on the semiconductor device, shorting the semiconductor device from the circuit containing the transformer;
    controlling the firing of the transformer by a microcontroller to reduce the inrush current upon power up; and
    said microcontroller monitoring the phase angle of the incoming power signal, storing the phase angle at shutdown, and making a fire determination when the phase angle approximately at the stored shutdown angle or if there is no stored shutdown angle at about 90 degrees.

17. The method of claim 16, further comprising opening a control relay on the secondary side of the transformer to protect downstream devices.

18. The method of claim 17, further comprising after full conduction is achieved on the semiconductor device, closing the control relay to complete the secondary side of the circuit containing the transformer.

19. The method of claim 16, further comprising determining the fire condition of the transformer.

20. The method of claim 19, wherein said step of determining the fire condition is performed by a microcontroller.

21. The method of claim 19, wherein the fire condition occurs when the 90 degrees phase angle of the incoming AC signal occurs.

22. The method of claim 19, wherein the fire condition occurs when the phase angle is equal to the last shutdown.

23. A method of stopping conduction to minimize the residual flux of a transformer, said method comprising:
    opening a relay to place a semiconductor device in the circuit containing the transformer;
    ramping the conduction of the semiconductor device from full to substantially zero conduction,
    after substantially zero conduction is reached on the semiconductor device, the residual flux of the transfer is minimized; and
    a microcontroller for controlling the firing of the transformer to reduce the inrush current upon power up monitoring the phase angle of the incoming power signal and storing the phase angle at shutdown, and
    the microcontroller making a fire determination when the phase angle is approximately at the stored shutdown angle or if there is no stored shutdown angle at about 90 degrees.

24. The method of claim 23, wherein said ramping to substantially zero conduction comprises falling below the holding current of the semiconductor device.

25. The method of claim 23, further comprising configuring the semiconductor device in a full conduction configuration.

* * * * *